United States Patent Office 3,412,094
Patented Nov. 19, 1968

3,412,094
5-ALKYL-2-AMINO-4-AZIDO-6-PHENYL-PYRIMIDINES AND CONGENERS
Kurt J. Rorig, Glenview, and Hans A. Wagner, Skokie, Ill., assignors to G. D. Searle & Co., Chicago, Ill., a corporation of Delaware
No Drawing. Continuation-in-part of application Ser. No. 568,401, July 28, 1966. This application June 21, 1967, Ser. No. 647,600
27 Claims. (Cl. 260—256.4)

ABSTRACT OF THE DISCLOSURE

Disclosed herein are diuretic and otherwise pharmacologically-valuable 4-azidopyrimidines and their salts, e.g., 2-amino-4-azido-5-ethoxyethyl-6-phenylpyrimidine.

---

The application for Letters Patent securing the invention herein described and claimed is a continuation-in-part of applicants' prior copending application Ser. No. 568,401 filed July 28, 1966 which in turn is a continuation-in-part of applicants' prior copending applications, Ser. Nos. 477,024, 523,034, and 523,522 filed Aug. 3, 1965, Jan. 26, 1966, and Jan. 27, 1966, respectively, all of which are now abandoned.

This invention relates to 5-alkyl-2-amino-4-azido-6-phenylpyrimidines and congeners, and to processes for the preparation thereof. More particularly, this invention provides new, useful, and unobvious chemical compounds of the formula

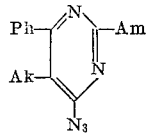

wherein Am represents an amino radical (—$NH_2$) which can be substituted by 1 or 2 alkyl radicals; Ak represents an alkyl, oxyalkyl, alkenyl, or alkynyl radical; and Ph represents a phenyl radical which can be substituted by 1 or more halogens and/or alkyl, alkoxy, and/or nitro radicals. Alternatively, but not necessarily simultaneously, Ak represents hydrogen and Ph represents a thienyl radical.

The alkyl, alkenyl, alkynyl, and alkoxy radicals specified herein are preferably of lower order—i.e., contain no more than 7 carbon atoms. Illustrative lower alkyl radicals include methyl, ethyl, propyl, isopropyl, butyl, isobutyl, sec-butyl, tert-butyl, pentyl, neopentyl, hexyl, isohexyl, heptyl, and like monovalent, saturated acyclic, straight- or branched-chain, hydrocarbon groupings of empirical formula $$-C_nH_{2n+1}$$

wherein $n$ represents a positive integer less than 8, among which methyl is especially advantageous. Lower alkenyl and lower alkynyl radicals are groupings which can be thought of as derived from polycarbon lower alkyl radicals by displacement of hydrogen to give rise to a double bond or a triple bond, respectively. Illustrative lower alkenyl radicals are vinyl, allyl, propenyl, isopropenyl, 2-methylallyl, 1-butenyl, 2-butenyl, 3-butenyl, and the like, among which allyl and 2-methylallyl are especially advantageous. Illustrative lower alkynyl radicals are ethynyl, 1-propynyl, 2-propynyl, 1-butynyl, 2-butynyl, 3-butynyl, and the like, among which 2-propynyl and 2-butynyl are especially advantageous. Lower alkoxy radicals are groupings of the formula lower alkyl —O— among which methoxy is especially advantageous.

The oxyalkyl radicals specified herein are groupings of the formula $$Q—O—C_nH_{2n}—$$

wherein Q represents hydrogen or an alkyl alkanoyl, cycloalkanoyl, optionally-halogenated benzoyl, diphenylacetyl, or aryl radical, and $n$ is defined as before. The alkanoyl radicals represented by Q, like the alkyl radicals represented thereby, are preferably of lower order and have the formula lower alkyl —CO—

The cycloalkanoyl radicals represented by Q have the formula

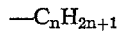

in which $x$ represents a positive integer preferably less than 5. The halogen-substituted benzoyl radicals represented by Q are preferably bromobenzoyl or chlorobenzoyl, the halogen being o-, m-, or p- oriented, ad lib. The aroyl radicals represented by Q are phenyl groupings which, like those represented by Ph, can be but are not necessarily substituted by one or more halogens and/or alkyl, alkoxy, and/or nitro radicals.

When either Ph or Q in the foregoing formulas represents a substituted phenyl radical, from 1 to 3 substituents are generally preferred, although as many as 5 are within the purview of this disclosure. Among these substituents, lower alkyl radicals (particularly methyl), lower alkoxy radicals (particularly methoxy), and the halogens chlorine and bromine are, as aforesaid, especially advantageous. The position of the substituents on the benzene ring relative to its attachment to the pyrimidine nucleus is not critical; and more than 1 type of substituent—for example, lower alkyl and halogen—can be present in a given embodiment, as previously indicated. When Ph represents thienyl, attachment thereof to the pyrimidine nucleus can be either via carbon atom number 2 or number 3.

Those skilled in the art will recognize that 4-azidopyrimidines are disposed, under favorable conditions, to participate in the so-called azidomethine-tetrazole equilibrium. [Temple et al., J. Org. Chem., 30, 829 (1965)]. The tetrazolo constituents of such an equilibrium mixture involving the instantly disclosed azidopyrimidines have the formula

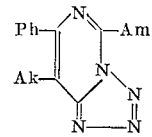

wherein Am, Ak, and Ph retain the meanings previously assigned; and the relative amounts of the two tautomeric forms of the subject compounds in existence under any given circumstance are dependent upon the physical state of the involved substances and their environment—whether they be solid or liquid and, if dissolved, in what solvent, at what temperature, and at what pH. Because the various forms in which tautomers exist cannot readily be represented by a single formula, the subject compounds are named and enformulated exclusively as azides *for convenience only*; both azido and tetrazolo forms, notwithstanding, are within the ambit of the described invention.

Equivalent to the basic amines of this invention for present purposes are corresponding non-toxic acid addition salts of the formula

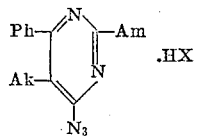

wherein Am, Ak, and Ph retain the meanings previously assigned and X represents 1 equivalent of an anion—for example, chloride, bromide, iodide, nitrate, phosphate, sulfate, sulfamate, methyl sulfate, ethyl sulfate benzenesulfonate, toluenesulfonate, acetate, lactate, succinate, malate, maleate, tartrate, citrate, gluconate, ascorbate, benzoate, cinnamate, or the like—which, in combination with the cationic portion of the depicted salts, is neither pharmacologically nor otherwise undesirable.

The compounds to which this invention relates are useful by reason of their valuable pharmacological properties. Thus, for example, they promote diuresis, both directly and by blocking the effect of desoxycorticosterone acetate on urinary sodium and potassium, in addition to which they are anti-inflammatory agents adapted to reduce the swelling and granuloma formation associated with the inflammatory response to tissue insult. Other biological responses produced by the subject compounds include anorexia, potentiation of barbiturate-induced sleeping time, and pepsin inhibition. Further, the compounds are anti-biotic versus *Trichophyton mentagrophytes*, *Chlorella vulgaris*, and dicotyledenous seed germination.

The diuretic utility of the instant compounds is evident from the results of standardized tests for their capacity to reverse the renal electrolyte effects of desoxycorticosterone acetate (DCA) in rats. Such a test, substantially as described by C. M. Kagawa in chapter 34 of volume II of "Evaluation of Drug Activities: Pharmacometrics," by D. R. Laurence and A. L. Bacharach, can be carried out as follows. A group (Group I) of 8 male Badger rats, each weighing between 150 and 200 gm., is adrenalectomized and maintained thereafter on sugar cubes and tap water ad libitum overnight. Each animal is thereupon subjected to these successive treatments: (a) 0.009 mg. of DCA dissolved in 0.1 ml. of corn oil is injected subcutaneously; (b) 4.4 mg. of test compound dissolved in 0.5 ml. of corn oil or other physiologically inert solvent, e.g. water, is administered orally; (c) 2.5 ml. of aqueous approximately 0.9% sodium chloride is injected subcutaneously. Urinary sodium and potassium are measured by customary techniques on samples of urine collected during the 4 hr. immediately following treatment. Controls are provided by second and third groups of 8 each 150–200 gm. rats concurrently and identically treated excepting that in Group II, 0.33 mg. of spironolactone is substituted for the test compound and the solution thereof is injected subcutaneously, while in Group III neither test compound nor spironolactone is administered. DCA produces sodium (Na) retention, loss of potassium (K), and a corresponding reduction in the mean log $Na \times 10/K$. Spironolactone serves as an index of the validity of the test, the dose of 0.33 mg. having been shown to induce a 50% reversal of the effects of the DCA. Hofmann et al., Arch. int. Pharmacodyn., 165, 476 (1967). Kagawa, in Endocrinology, 74, 724 (1964), reported a standard error of ±0.084 per 4-rat response, determined from a large number of tests and based on 60 degrees of freedom, for the mean log $Na \times 10/K$ measurement. From this it can be calculated that the least significant difference ($P<0.05$) in mean log $Na \times 10/K$ between 2 groups of 8 rats each is ±0.168. It follows that when mean log $Na \times 10/G$ for Group I or Group II exceeds the value for Group III by at least 0.168 log units, the reversal of the renal electrolyte effects of DCA represented thereby is significant. Results of tests by the foregoing procedure on 2-amino-4-azido-6-phenylpyrimidine, 2-amino-4-azido-5-methyl-6-phenylpyrimidine, 2-amino-4-azido-6-phenyl-5-(2-propynyl)pyrimidine, and 2-amino-4-azido-5-ethoxyethyl-6-phenylpyrimidine, the products of Examples 1B, 2, 8C, and 33D hereinafter, respectively, are summarized in Table I.

TABLE I

| | Mean Log Na×10/K | | |
| --- | --- | --- | --- |
| | Group I | Group II | Group III |
| Product of Experiments: | | | |
| 1B | 1.21 | 1.18 | 0.84 |
| 2 | 1.21 | 1.12 | 0.91 |
| 8C | 1.23 | 1.27 | 0.98 |
| 33D | 1.30 | 1.12 | 0.86 |

Those skilled in the art will recognize that observations of activity in standardized tests for particular pharmacological effects as hereinbefore set forth are fundamental to the development of valuable new drug products, both veterinary and human.

Preparation of the compounds hereof wherein the constituents designated below by Ak' exclude hydroxyalkyl and corresponding ester groupings but otherwise are identical with those defined by Ak above proceeds by heating an appropriate ethyl aroylacetate

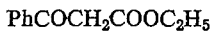

and halide

(Ph being defined as before and the halogen being chlorine, bromine, or occasionally iodine) together in the presence of sodium hydride or lower alkoxide, using ethyl alcohol or dimethyl sulfoxide as solvent, to give the corresponding substituted ester

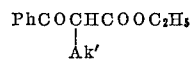

The latter ester, in turn, is condensed with an appropriate guanidine salt

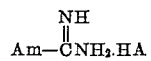

(Am being defined as before and A representing 1 equivalent of an appropriate anion, such as chloride, carbonate, or sulfate) by heating in the presence of sodium methoxide, using ethyl or tert-butyl alcohol as solvent, to give the corresponding 4-pyrimidinol

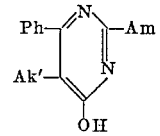

The pyrimidinol hydroxyl is replaced with chlorine via hot phosphorus oxychloride, and the resulting 4-chloropyrimidine is converted to the 4-azidopyrimidine by heating with sodium azide in dimethyl sulfoxide or aqueous ethyl alcohol.

As an exception to the foregoing general procedure, 2-amino-4-azido-5-methyl-6-(p-nitrophenyl)pyrimidine is obtained from 2-amino-4-azido-5-methyl-6-phenyl-pyrimidine by contacting the latter in sulfuric acid solution at −5° C. to −10° C. with potassium nitrate. A further exception to the procedure generally employed is the preparation of 4-azido-2-dimethylamino-5-methyl-6-phenylpyrimidine from 4-chloro-2-dimethylamino-5-methyl-6-phenylpyrimidine via the corresponding 4-hydrazino compound. The latter intermediate is obtained by heating the chloro intermediate with hydrazine hydrate in absolute ethyl alcohol, and is converted to the 4-azido compound on contact with sodium nitrite in cold aqueous acetic acid. The 5-pyrimidine alkanols of the invention are prepared by substituting an appropriate acetoxyalkyl halide for the halide called for in the general procedure above. The resultant alkanol is esterified by contacting, in the presence of pyridine, with an acid chloride or anhydride wherein the acyl component is appropriately selected from among the alkanoyl, cycloalkanoyl, optionally - halogenated benzoyl, and diphenylacetyl radicals represented above by Q. Alternatively, the α-methyl-5-pyrimidineethanols of this invention can be prepared by substituting 3-bromopropyne for the acetoxyacetyl halide in the reaction with ethyl aroylacetate, thereby obtaining the ester

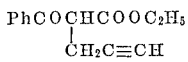

which, on condensation with an appropriate guanidine salt as aforesaid, yields the corresponding 4-pyrimidinol

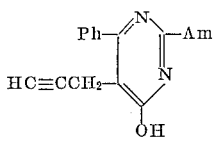

The pyrimidinol hydroxyl is converted to an azido group via the 4-chloro compound by consecutive treatment with phosphorus oxychloride and sodium azide as previously described, whereupon the propynyl side-chain is hydrated by heating with mercuric sulfate in aqueous sulfuric acid. The carbonyl function in the resultant acetonyl side-chain is then reduced to hydroxyl with lithium tri-tert-butoxy aluminum hydride in tetrahydrofuran.

Conversion of a basic amine of this invention to a corresponding acid addition salt is accomplished by mixing the base with at least 1 equivalent of any of various inorganic and strong organic acids in which the anionic portion is defined by X hereinbefore.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

Example 1

(A) 2-amino-4-chloro-6-phenylpyrimidine.—A mixture of 20 parts of 2-amino-4-hydroxy-6-phenylpyrimidine and 50 parts of phosphorus oxychloride is heated at the boiling point under reflux for 35 minutes, whereupon the resultant brown solution is stirred into 1000 parts of ice. Stirring is continued for 15 minutes, at which point sufficient concentrated ammonium hydroxide is cautiously introduced to bring the pH to 8, temperature being maintained at 0° by addition of ice as needed. The mixture thus obtained is stirred for 2 hours, whereupon the insoluble solids thrown down are separated by filtration, washed with water, dried in air, and taken up in hot methanol. The methanol solution is mixed with decolorizing charcoal and filtered. The filtrate is concentrated by distillation to the point of incipient precipitation, then chilled. The solid precipitate which results is filtered off and dried in air. The product thus isolated is 2-amino-4-chloro-6-phenylpyrimidine.

(B) 2-amino-4-azido-6-phenylpyrimidine.—To a solution of 20 parts of 2-amino-4-chloro-6-phenylpyrimidine in 100 parts of dimethyl sulfoxide is added 9 parts of sodium azide. The resultant solution is stirred at 65° for 5 hours, then at room temperatures overnight, whereupon it is stirred into 1000 parts of water. Insoluble solids are separated by filtration, washed with water, dried in air, and recrystallized from methanol to give needles of 2-amino-4-azido-6-phenylpyrimidine melting at 221–222°. The product has the formula

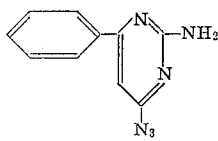

Example 2

2-amino-4-azido-5-methyl-6-phenylpyrimidine.—A suspension of 15 parts of 2-amino-4-chloro-5-methyl-6-phenylpyrimidine and 15 parts of sodium azide in 400 parts of 95% ethanol is heated at the boiling point under reflux for 3 hours, then chilled, and finally filtered. The filter cake is washed with 200 parts of ice water, then recrystallized from 500 parts of 95% ethanol to give white, feathery 2-amino-4-azido-5-methyl-6-phenylpyrimidine melting at 212° with gas evolution and darkening. The product has the formula

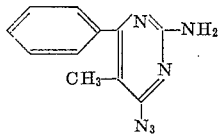

Example 3

2-amino-4-azido-5-ethyl-6-phenylpyrimidine.—To a solution of 70 parts of 2-amino-4-chloro-5-ethyl-6-phenylpyrimidine in 672 parts of absolute ethanol at the boiling point under reflux is added a solution of approximately 23 parts of sodium azide in 210 parts of water. The resultant solution is maintained at the boiling point under reflux for 6½ hours, during which time a solid precipitate forms. The mixture is chilled and the precipitate thereupon separated by filtration, washed well with hot water, and dried in air to give pale green 2-amino-4-azido-5-ethyl-6-phenylpyrimidine melting at approximately 180–180.5°. The product has the formula

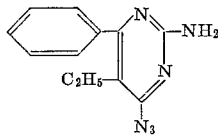

Example 4

2-amino-4-azido-6-phenyl-5-propylpyrimidine.—To a solution of approximately 74 parts of 2-amino-4-chloro-6-phenyl-5-propylpyrimidine in 1100 parts of dimethyl sulfoxide is added a solution of approximately 23 parts of sodium azide in 100 parts of water. The resultant solution is heated at 60–75° with agitation for 4 hours, whereupon heating is discontinued and agitation maintained for a further 17½ hours. A solid precipitates. The resultant mixture is poured into 8000 parts of water and mixed therewith for 15 minutes, at which point insoluble solids are separated by filtration, washed with cold water, dried at 65° in vacuo, and recrystallized from aqueous 60% ethanol to give 2-amino-4-azido-6-phenyl-5-propylpyrimidine melting at 125–128°. The product has the formula

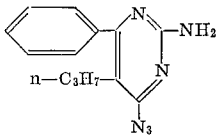

Example 5

2-amino-4-azido-5-butyl-6-phenylpyrimidine.—To a solution of 8 parts of 2-amino-5-butyl-4-chloro-6-phenylpyrimidine in 120 parts of absolute ethanol at the boiling point under reflux is added a solution of 4 parts of sodium azide in 25 parts of water. Boiling is continued for 8 hours, whereupon the reaction mixture is cooled to room temperature and then diluted with 5 volumes of cold water. The resultant mixture—containing an oily, lumpy precipitate—is extracted with ether. The ether extract is washed well with water, dried over anhydrous sodium sulfate, and stripped of solvent by vacuum distillation. The residue is recrystallized from a mixture of hexane and ethanol to give 2-amino-4-azido-5-butyl-6-phenylpyrimidine as yellow crystals melting at 130–131°. The product has the formula

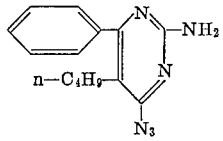

Example 6

(A) 5-allyl-2-amino-4-chloro-6-phenylpyrimidine.—Substitution of 20 parts of 5-allyl-2-amino-4-hydroxy-6-phenylpyrimidine for the 2-amino-4-hydroxy-6-phenylpyrimidine called for in Example 1A affords, by the procedure there detailed, 5-allyl-2-amino-4-chloro-6-phenylpyrimidine.

(B) 5-allyl-2-amino-4-azido-6-phenylpyrimidine.—Substitution of 20 parts of 5-allyl-2-amino-4-chloro-6-phenylpyrimidine for the 2-amino-4-chloro-6-phenylpyrimidine called for in Example 1B affords, by the procedure there detailed, 5-allyl-2-amino-4-azido-6-phenylpyrimidine melting at 180–181°. The product has the formula

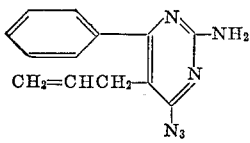

Example 7

(A) 2-amino-4-chloro-5-(2-methylallyl)-6-phenyl-pyrimidine.—A mixture of 50 parts of 2-amino-5-methylallyl-6-phenyl-4-pyrimidinol and 420 parts of phosphorus oxychloride is heated at the boiling point under reflux for 2 hours, then freed of excess oxychloride by vacuum distillation. The residue is poured into 700 parts of ice and water, and the resultant mixture is made basic with ammonium hydroxide. The yellow solid which precipitates is separated by filtration, washed with hot water, dried in air, and recrystallized from aqueous ethanol to give 2-amino-4-chloro-5-(2-methylallyl)-6-phenylpyrimidine melting at 134–136°.

(B) 2-amino-4-azido-5-(2-methylallyl)-6-phenylpyrimidine.—To a solution of 80 parts of 2-amino-4-chloro-5-methylallyl-6-phenylpyrimidine in 1100 parts of dimethyl sulfoxide is added a solution of approximately 24 parts of sodium azide in 100 parts of water. The resultant solution is heated at 60–75° with agitation for 4 hours, whereupon heating is discontinued and agitation maintained for a further 15 hours. A solid precipitates. The resultant mixture is poured into 8000 parts of water and mixed therewith for 15 minutes, at which point insoluble solids are separated by filtration, washed with cold water, dried at 65° in vacuo, and recrystallized from absolute ethanol to give 2-amino-4-azido-5-(2-methylallyl)-6-phenylpyrimidine melting at 185–187°. The product has the formula

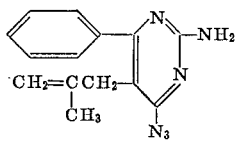

Example 8

(A) 2-amino-6-phenyl-5-(2-propynyl)-4-pyrimidinol.—A mixture of 230 parts of ethyl 2-benzoyl-4-pentynoate, 100 parts of guanidine hydrochloride, 56 parts of sodium methoxide, and 1200 parts of tert-butanol is heated at the boiling point under reflux for 18 hours, then stripped of solvent by vacuum distillation. The residue is mixed with 1500 parts of water, followed by 100 parts of glacial acetic acid. Insoluble solids are filtered off, washed with water, and dried in air. The product thus isolated is 2-amino-6-phenyl-5-(2-propynyl)-4-pyrimidinol.

(B) 2-amino-4-chloro-6-phenyl-5-(2-propynyl)pyrimidine.—A mixture of 15 parts of 2-amino-6-phenyl-5-(2-propynyl)-4-pyrimidinol and 40 parts of phosphorus oxychloride is heated at the boiling point under reflux for 35 minutes, then stirred into 1000 parts of ice. Stirring is continued for 15 minutes, at which point sufficient aqueous ammonium hydroxide is introduced to render the mixture alkaline, temperature being maintained below 5° by concomitant addition of ice. The resultant mixture is stirred for 15 minutes, at the end of which time insoluble solids are filtered off, washed with water, dried in air, and taken up in ether. The ether solution is consecutively washed with dilute aqueous ammonium hydroxide and water, dried over anhydrous sodium sulfate, and filtered. The filtrate is treated with decolorizing charcoal and solvent thereupon removed by vacuum distillation. The crystalline residue is 2-amino-4-chloro-6-phenyl-5-(2-propynyl)pyrimidine melting at 175–177°

(C) 2-amino-4-azido-6-phenyl-5-(2-propynyl)pyrimidine.—A mixture of 20 parts of 2-amino-4-chloro-6-phenyl-5-(2-propynyl)pyrimidine, 7 parts of sodium azide, and 140 parts of dimethyl sulfoxide is stirred at 70° for 6 hours, whereupon heating is discontinued while stirring is maintained at room temperatures overnight. The resultant mixture is poured into 1400 parts of water, and the mixture thus obtained is stirred for 20 minutes. Insoluble solids are then filtered off, washed with cold water, dried in air, and taken up in the minimum amount of boiling methanol. The methanol solution is mixed with decolorizing charcoal and filtered. From the filtrate, on chilling, 2-amino-4-azido-6-phenyl-5-(2-propynyl)pyrimidine is precipitated as needles melting at approximately 190.5–191°. The product has the formula

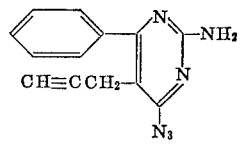

Example 9

(A) Ethyl 2-benzoyl-4-hexynoate.—Replacement of 3-bromopropyne with an equivalent amount of 1-bromo-2-butyne in the procedure of Ebnöther et al., Helv., 42, 1201 (1959) at page 1213 for preparation of ethyl 2-benzoyl-4-pentynoate affords ethyl 2-benzoyl-4-hexynoate boiling at 147–152°/1.8 mm.

(B) 2-amino-5-(2-butynyl)-6-phenyl-4-pyrimidinol.—Substitution of approximately 240 parts of ethyl 2-benzoyl-4-hexynoate for the ethyl 2-benzoyl-4-pentynoate called for in Example 8A affords, by the procedure there detailed, 2-amino-5-(2-butynyl)-6-phenyl-4-pyrimidinol melting at 308–310° with decomposition.

(C) 2-amino-5-(2-butynyl)-4-chloro-6-phenylpyrimidine.—Substitution of 15 parts of 2-amino-5-(2-butynyl)-6-phenyl-4-pyrimidinol for the 2-amino-4-chloro-6-phenyl-5-(2-propynyl)pyrimidinol called for in Example 8B affords, by the procedure there detailed, 2-amino-5-(2-butynyl)-4-chloro-6-phenylpyrimidine melting at approximately 150–150.5°.

(D) 2-amino-4-azido-5-(2-butynyl)-6-phenylpyrimidine.—Substitution of 20 parts of 2-amino-5-(2-butynyl)-4-chloro-6-phenylpyrimidine for the 2-amino-4-chloro-6-phenyl-5-(2-propynyl)pyrimidine called for in Example 8C affords, by the procedure there detailed, 2-amino-4-azido-5-(2-butynyl)-6-phenylpyrimidine melting at 172–173°. The product has the formula

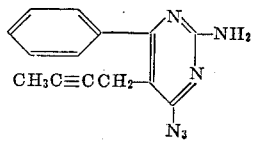

Example 10

(A) 5 - methyl - 2 - methylamino - 6 - phenyl - 4 - pyrimidinol.—A mixture of 57 parts of ethyl 2-benzoylpropionate, 35 parts of methylguanidine sulfate, 17 parts of sodium methoxide, and 320 parts of absolute ethanol is heated at the boiling point with agitation under reflux overnight. Solvent is thereupon removed by vacuum distillation, the residue is mixed with 300 parts of water, and sufficient acetic acid is added to induce acidity. The insoluble solids thrown down are filtered off, washed with water, dried in air, and recrystallized from absolute ethanol to give 5-methyl-2-methylamino-6-phenyl-4-pyrimidinol melting around 220°.

(B) 4 - chloro - 5 - methyl - 2 - methylamino - 6 - phenyl pyrimidine.—Substitution of 15 parts of 5-methyl-2-methylamino-6-phenyl-4-pyrimidinol for the 2-amino-6-phenyl-5-(2-propynyl)-4-pyrimidinol called for in Example 8B affords, by the procedure there detailed, 4-chloro-5-methyl-2-methylamino-6-phenylprimidine melting at 144–145°.

(C) 4 - azido - 5 - methyl - 2 - methylamino - 6 - phenyl-pyrimidine.—Substitution of 20 parts of 4-chloro-5-methyl-2-methylamino-6-phenylpyrimidine for the 2-amino-4-chloro-6-phenyl-5-(2-propynyl)pyrimidine called for in Example 8C affords, by the procedure there detailed, 4 - azido - 5 - methyl - 2 - methylamino - 6 - phenylpyrimidine melting at 142–143°. The product has the formula

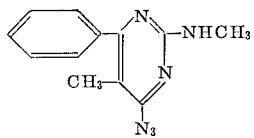

Example 11

(A) 2 - ethylamino - 5 - methyl - 6 - phenyl - 4 - pyrimidinol.—A mixture of 309 parts of ethyl 2-benzoylpropionate, 272 parts of ethylguanidine sulfate, 108 parts of sodium methoxide, and 1500 parts of absolute ethanol is heated at the boiling point with agitation under reflux overnight. Solvent is thereupon removed by vacuum distillation, and the residue is mixed with 1800 parts of water. The mixture is acidified with acetic acid; and the insoluble solids thrown down are filtered off, washed well with water, and dried in air. The material thus isolated is 2-ethylamino-5-methyl-6-phenyl-4-pyrimidinol.

(B) 4 - chloro - 2 - ethylamino - 5 - methyl - 6 - phenylpyrimidine.—Substitution of 15 parts of 2-ethylamino-5-methyl-6-phenyl-4-pyrimidinol for the 2-amino-6-phenyl-5-(2-propynyl)-4-pyrimidinol called for in Example 8B affords, by the procedure there detailed, 4-chloro-2-ethylamino-5-methyl-6-phenylpyrimidine.

(C) 4 - azido - 2 - ethylamino - 5 - methyl - 6 - phenyl-pyrimidine.—Substitution of 20 parts of 4-chloro-2-ethylamino-5-methyl-6-phenylpyrimidine for the 2-amino-4-chloro-6-phenyl-5-(2-propynyl)pyrimidine called for in Example 8C affords, by the procedure there detailed, 4-azido-2-ethylamino-5-methyl-6-phenylpyrimidine, having the formula

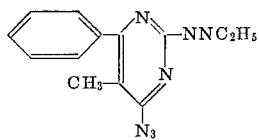

Example 12

(A) 2 - dimethylamino - 5 - methyl - 6 - phenyl - 4 - pyrimidinol.—A mixture of 31 parts of ethyl 2-benzoylpropionate, 27 parts of 1,1-dimethylguanidine sulfate, 11 parts of sodium methoxide, and 150 parts of absolute ethyl alcohol is heated at the boiling point under reflux with agitation overnight. Solvent is thereupon removed by vacuum distillation and the residue mixed with 180 parts of water. The mixture is acidified with acetic acid; and the insoluble solids thrown down are filtered off, washed well with water, and dried in air. The material thus isolated is 2-dimethylamino-5-methyl-6-phenyl-4-pyrimidinol.

(B) 4 - chloro - 2 - dimethylamino - 5 - methyl - 6 - phenyl-pyrimidine.—Substitution of 15 parts of 2-dimethyl-yl-amino-5-methyl-6-phenyl-4-pyrimidinol for the 2-amino-6-phenyl-5-(2-propynyl)-4-pyrimidinol called for in Example 8B affords, by the procedure there detailed, 4 - chloro - 2 - dimethylamino - 5 - methyl - 6 - phenylpyrimidine melting at 88–90°.

(C) 2 - dimethylamino - 4 - hydrazino - 5 - methyl - 6 - phenylpyrimidine.—A mixture of 5 parts of 2-dimethylamino-4-chloro-5-methyl-6-phenylpyrimidine, 20 parts of hydrazine hydrate, and 20 parts of absolute ethyl alcohol is heated at the boiling point under reflux for 5 hours, then chilled to induce crystallization. The precipitate thrown down is 2-dimethylamino-4-hydrazino-5-methyl-6-phenylpyrimidine which, filtered off and dried in air, melts at approximately 176–177°.

(D) 4 - azido - 2 - dimethylamino - 5 - methyl - 6 - phenylpyrimidine.—To a solution of 10 parts of 2-dimethyl - amino - 4 - hydrazino - 5 - methyl - 6 - phenyl - pyrimidine in a mixture of 150 parts of glacial acetic acid and 100 parts of water at 0° is slowly added a solution of 5 parts of sodium nitrite in 50 parts of water. The resultant mixture is maintained at 0° with agitation while precipitation is completed. The colorless product thrown down is 4-azido-2-dimethylamino-5-methyl-6-phenylpyrimidine which, separated by filtration and dried in air, melts at approximately 74.0–74.5°. The product has the formula

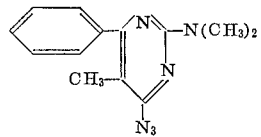

Example 13

(A) 2 - amino - 5 - methyl - 6 - (2,5 - dimethylphenyl) - 4-pyrimidinol.—To a solution of 44 parts of sodium methoxide in 500 parts of absolute ethanol is added a solution of 66 parts of guanidine hydrochloride in 500 parts of absolute ethanol. The sodium chloride which precipitates is filtered off, and to the filtrate is added 117 parts of ethyl α-(2,5-dimethylbenzoyl)propionate. The resultant mixture is heated at around 90° for 10 minutes, then allowed to stand at 0° for 12 hours. The yellowish precipitate which forms is filtered off and combined with the precipitate obtained by concentrating the filtrate to ½ its original volume, diluting the concentrate with 1000 parts of hot water, and chilling the resultant mixture while precipitation is completed. The flaky crystals thus isolated are 2 - amino-5-methyl-6-(2,5-dimethylphenyl)-4-pyrimidinol melting at about 280°.

(B) 2 - amino - 4 - chloro - 5 - methyl - 6 - (2,5 - dimethylphenyl)pyrimidine.—A mixture of 57 parts of 2-amino - 5 - methyl - 6 - (2,5 - dimethylphenyl) - 4 - pyrimidinol and 420 parts of phosphorus oxychloride is heated at the boiling point under reflux for 3 hours, whereupon excess oxychloride is removed by vacuum distillation. The residue is poured into 5 volumes of ice water. Upon alkalization of the resultant mixture with aqueous dilute potassium hydroxide at a temperature below 20°, and subsequent chilling at 5°, 2-amino-4-chloro-5-methyl-6-(2,5-dimethylphenyl)pyrimidine precipitates. The product is filtered off and dried in air.

(C) 2 - amino - 4 - azido - 5 - methyl - 6 - (2,5 - dimethylphenyl)pyrimidine.—Substitution of 20 parts of 2-amino - 4 - chloro - 5 - methyl - 6 - (2,5 - dimethylphenyl) pyrimidine for the 2-amino-4-chloro-6-phenylpyrimidine called for in Example 1B affords, by the procedure there detailed, 2 - amino-4-azido-5-methyl-6-(2,5-dimethylphenyl)pyrimidine, the formula of which is

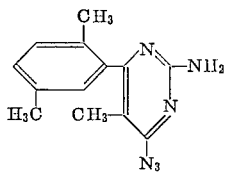

Example 14

(A) 2 - amino - 4 - chloro - 6 - (p - chlorophenyl) - 5-methylpyrimidine.—A mixture of 25 parts of 2-amino-6-(p - chlorophenyl)-5-methyl-4-pyrimidinol hydrochloride and 210 parts of phosphorus oxychloride is heated at the boiling point under reflux for 2 hours, whereupon excess oxychloride is removed by vacuum distillation. The residual oil is poured into 350 parts of ice, and the resultant mixture is made alkaline with ammonium hydroxide while the temperature is maintained below 25°. Insoluble solids are filtered off and dried in air. The product thus isolated is 2-amino-4-chloro-6-(p-chlorophenyl)-5-methylpyrimidine melting at 191–193°.

(B) 2 - amino - 4 - azido - 6 - (p - chlorophenyl) - 5-methylpyrimidine.—To a solution of 110 parts of 2-amino-4-chloro-6-(p-chlorophenyl) - 5 - methylpyrimidine in 800 parts of absolute ethanol at the boiling point under reflux is added to a solution of approximately 33 parts of sodium azide in 300 parts of water. Boiling is continued for 8 hours, whereupon the reaction mixture is chilled to promote precipitation of insoluble solids. The solids are separated by filtration, washed with hot water, dried in vacuo, and recrystallized from a mixture of ethanol and dioxane to give 2 - amino-4-azido-6-(p-chlorophenyl) - 5-methylpyrimidine as a pale yellow powder melting in the range 212–220° with decomposition. The product has the formula

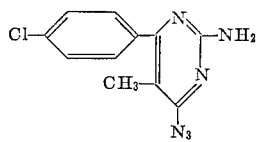

Example 15

(A) Ethyl m-bromobenzoylacetate.—A solution of sodium ethoxide is prepared by dissolving 65 parts of sodium in 800 parts of absolute ethanol. To ½ of this solution is added, during 30 minutes and with continuous agitation throughout this and all subsequent additions, 185 parts of ethyl acetoacetate, whereupon the temperature is lowered to 4° and 188 parts of m-bromobenzoyl chloride is introduced at a rate such that the temperature does not exceed 12°. Temperature is then returned to 4° and half of the remaining sodium ethoxide solution is added, followed by a solution of 94 parts of m-bromobenzoyl chloride in 100 parts of ether, the rates of addition once again being such that temperatures no higher than 12° result. Temperature is returned a second time to 4°, whereupon the balance of the sodium ethoxide solution and another 94 parts of m-bromobenzoyl chloride in 100 parts of ether are consecutively added in the same manner as before. These additions being complete, insoluble solids are filtered out and suspended in 1900 parts of water. To this suspension is added, with stirring, 93 parts of ammonium chloride and 167 parts of concentrated ammonium hydroxide. The resultant mixture is heated to 45° and maintained thereat with vigorous stirring for 3 hours, then cooled and extracted with ether. The extract, dried over calcium chloride and stripped of solvent by vacuum distillation, affords ethyl m-bromobenzoylacetate as the residue.

(B) Ethyl 2 - (m - bromobenzoyl)propionate.—To a solution of 23 parts of sodium in 390 parts of absolute ethanol is added 371 parts of ethyl m-bromobenzoylacetate. The resultant mixture is heated at the boiling point under reflux while 142 parts of methyl iodide is stirred in during 20 minutes. Boiling and stirring are continued for 1 hour longer, whereupon solvent is removed by vacuum distillation. The residue is mixed with 500 parts of water, and the mixture thus obtained is extracted with benzene. The benzene extract is consecutively washed with aqueous 5% sodium hydroxide and water, dried over anhydrous sodium sulfate, and stripped of solvent by vacuum distillation. The residue is ethyl 2-(m-bromobenzoyl)propionate.

(C.) 2 - amino-6-(m-bromophenyl)-5-methyl-4-pyrimidinol.—To a solution of 374 parts of sodium methoxide in 5000 parts of absolute ethanol is added a solution of 660 parts of guanidine hydrochloride in 5000 parts of absolute ethanol. The sodium chloride which precipitates is removed by filtration and 1430 parts of ethyl 2-(m-bromobenzoyl)propionate is introduced. The resultant mixture is heated at 90–95° for 10 minutes, then allowed to stand at 25° for 12 hours. It is then diluted with 10,000 parts of water; and the mixture thus obtained is chilled, whereupon 2-amino-6-(m-bromophenyl)-5-methyl-4-pyrimidinol precipitates. The product is isolated by filtration and dried in air.

(D) 2 - amino-6-(m-bromophenyl)-4-chloro-5-methylpyrimidine.—A mixture of 226 parts of 2-amino-6-(m-bromophenyl)-5-methyl-4-pyrimidinol and 670 parts of phosphorus oxychloride is heated at the boiling point under reflux for 2 hours, whereupon excess oxychloride is removed by vacuum distillation. The residual syrup is mixed with aqueous 30% ammonium hydroxide to decompose any remaining oxychloride. Insoluble solids are filtered out, washed with ice water, and dried in air. The product thus isolated is 2-amino-6-(m-bromophenyl)-4-chloro-5-methylpyrimidine.

(E) 2 - amino - 4-azido-6-(m-bromophenyl)-5-methylpyrimidine.—A mixture of 193 parts of 2-amino-6-(m-bromophenyl)-4-chloro-5-methylpyrimidine and 150 parts of sodium azide in 4000 parts of 80% ethanol is heated at the boiling point under reflux for 4 hours, then chilled. Insoluble solids are filtered out; and the filter cake is washed with ice water, dried in air, and recrystallized from absolute ethanol to afford 2-amino-4-azido-6-(m-bromophenyl)-5-methylpyrimidine as a white powder. The product has the formula

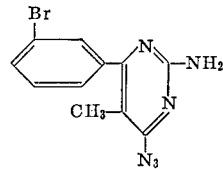

Example 16

(A) Ethyl 2 - (p-ethoxybenzoyl)propionate.—Substitution of 235 parts of ethyl p-ethoxybenzoylacetate for the ethyl m-bromobenzoylacetate called for in Example 15B affords, by the procedure there detailed, ethyl 2-(p-ethoxybenzoyl)propionate.

(B) 2 - amino-6-(p-ethoxyphenyl)-5-methyl-4-pyrimidinol.—Substitution of 1250 parts of ethyl 2-(p-ethoxybenzoyl)propionate for the ethyl 2-(m-bromobenzoyl)propionate called for in Example 15C affords, by the procedure there detailed 2-amino-6-(p-ethoxyphenyl)-5-methyl-4-pyrimidinol.

(C) 2 - amino - 4-chloro-6-(p-ethoxyphenyl)-5-methylpyrimidine.—Substitution of 200 parts of 2-amino-6-(p-ethoxyphenyl)-5-methyl-4-pyrimidinol for the 2-amino-6-(p - bromophenyl) - 5 - methyl-4-pyrimidinol called for in Example 15D affords, by the procedure there detailed, 2-amino-4-chloro-6-(p-ethoxyphenyl)-5-methylpyrimidine.

(D) 2 - amino - 4-azido-6-(p-ethoxyphenyl)-5-methylpyrimidine.—Substitution of 170 parts of 2 - amino - 4-chloro-6-(p-ethoxyphenyl)-5-methylpyrimidine for the 2-amino - 6-(m-bromophenyl)-4-chloro-5-methylpyrimidine called for in Example 15E affords, by the procedure there detailed, 2 - amino-4-azido-6-(p-ethoxyphenyl)-5-methyl-pyrimidine, the formula of which is

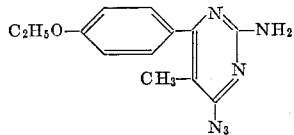

Example 17

(A) 2 - amino - 4 - chloro-6-(3,4-dimethoxyphenyl)-5-methylpyrimidine.—A mixture of 165 parts of 2-amino-6-(3,4-dimethoxyphenyl)-5-methyl-4-pyrimidinol and 360 parts of phosphorus oxychloride is heated at the boiling point under reflux for 30 minutes, then poured into a mixture of 2000 parts of ice and 2000 parts of water. Insoluble solids are triturated with the liquid phase, following which the pH is brought to 8 with concentrated ammonium hydroxide, temperature being kept below 20° via external cooling. The resultant crystalline solids are filtered off, washed with cold water, dried in air, and recrystallized from absolute ethanol to give 2-amino-4-chloro-6-(3,4-dimethoxyphenyl)-5-methylpyrimidine melting at 174–175°.

(B) 2 - amino - 4 - azido-6-(3,4-dimethoxyphenyl)-5-methylpyrimidine.—To a solution of 60 parts of 2-amino-4 - chloro-6-(3,4-dimethoxyphenyl)-5-methylpyrimidine in 640 parts of absolute ethanol at the boiling point under reflux is added a solution of approximately 16 parts of sodium azide in 150 parts of water. Boiling is continued for 8 hours, whereupon the reactants are chilled to around 5° and maintained thereat for 30 minutes. Insoluble solids are thereupon filtered out, washed with warm water, dried in vacuo, and recrystallized from dioxane to give 2-amino-4-azido-6-(3,4-dimethoxyphenyl)-5-methylpyrimidine as a white solid melting at 230–235° with decomposition. The product has the formula

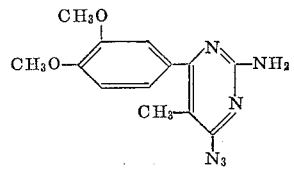

Example 18

(A) 2 - amino - 5 - methyl-6-(o-nitrophenyl)-4-pyrimidinol.—Substitution of 1260 parts of ethyl 2-(o-nitrobenzoyl)propionate for the ethyl 2-(m-bromobenzoyl)propionate called for in Example 15C affords, by the procedure there detailed, 2 - amino - 5 - methyl - 6 - (o-nitrophenyl)-4-pyrimidinol.

(B) 2 - amino - 4 - chloro-5-methyl-6-(o-nitrophenyl)-pyrimidine.—Substitution of 201 parts of 2 - amino - 5-methyl-6-(o-nitrophenyl)-4-pyrimidinol for the 2-amino-6-(m-bromophenyl)-5-methyl-4-pyrimidinol called for in Example 15D affords, by the procedure there detailed, 2-amino-4-chloro-5-methyl-6-(o-nitrophenyl)pyrimidine.

(C) 2 - amino - 4 - azido - 5-methyl-6-(o-nitrophenyl)-pyrimidine. Substitution of 170 parts of 2-amino-4-chloro-5-methyl-6-(o-nitrophenyl)pyrimidine for the 2-amino-6-(m-bromophenyl)-4-chloro-5-methylpyrimidine called for in Example 15E affords, by the procedure there detailed, 2 - amino - 4-azido-5-methyl-6-(o-nitrophenyl)pyrimidine, having the formula

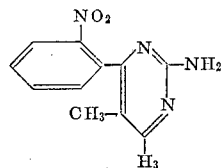

Example 19

2 - amino - 4 - azido-5-methyl-6-(p-nitrophenyl)pyrimidine.—To a solution of 100 parts of 2-amino-4-azido-5-methyl-6-phenylpyrimidine in 2700 parts of concentrated sulfuric acid at temperatures in the range —5° to —10° is added, portionwise in small increments during 1 hour with vigorous stirring, 71 parts of powdered potassium nitrate. Stirring is continued an additional 30 minutes at —5° to —10°, and for a further 30 minutes while the reactants are permitted to warm to room temperature. The resultant mixture is stirred into 1500 parts of ice, and the mixture thus obtained is made alkaline with aqueous 20% sodium hydroxide. Insoluble solids are filtered out, washed with cold water, dried in vacuo at 80°, and recrystallized from aqueous ethylene glycol monomethyl ether to give 2-amino-4-azido-5-methyl-6-(p-nitrophenyl) pyrimidine as yellow crystals melting at 221–224° with decomposition. A further recrystallization from aqueous ethylene glycol monomethyl ether, using decolorizing charcoal in process, affords colorless 2-amino-4-azido-5-methyl-6-(p-nitrophenyl)pyrimidine melting at 223–225° with decomposition. The product has the formula

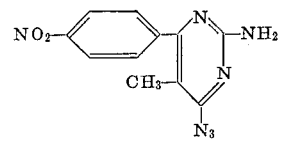

Example 20

(A) 2-amino - 4 - chloro-5-methyl-6-(2-thienyl)pyrimidine.—A mixture of 150 parts of 2-amino-5-methyl-6-(2-thienyl)-4-pyrimidinol and 514 parts of phosphorus oxychloride is heated at the boiling point under reflux with stirring for 45 minutes, then poured into a mixture of 5000 parts of ice and 5000 parts of water. The resultant mixture is stirred for 30 minutes while the brown oil thrown down granulates. Temperatures below 20° are maintained while sufficient ammonium hydroxide is introduced to render the mixture basic. Insoluble tan solids which result are filtered off, washed with cold water, dried in vacuo at 100°, and recrystallized from absolute ethanol to give 2-amino-4-chloro-5-methyl-6-(2-thienyl) pyrimidine melting at 206–208°.

(B) 2-amino - 4 - azido-5-methyl-6-(2-thienyl)pyrimidine.—To a suspension of 12 parts of 2-amino-4-chloro-5-methyl-6-(2-thienyl)pyrimidine in 80 parts of ethanol at the boiling point under reflux is added, with stirring, a solution of 4 parts of sodium azide in 30 parts of water. Boiling with stirring is continued for 8 hours, whereupon the reaction mixture is chilled. Insoluble solids are filtered out, washed with hot water, dried in vacuo at 90°, and recrystallized from ethanol to give 2-amino-4-azido-5-methyl-6-(2-thienyl)pyrimidine melting at 240–242° with decomposition. The product has the formula

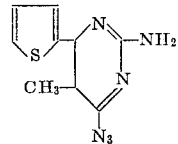

Example 21

(A) Ethyl 2-(2-acetoxyethyl)benzoylacetate.—To a solution of 192 parts of ethyl benzoylacetate and 24 parts of sodium hydride in 1000 parts of dimethyl sulfoxide at 60° under nitrogen is added, during 2 hours with constant stirring, 167 parts of 2-bromoethyl acetate. Temperature is then increased to 75° and stirring continued thereat for a further 16 hours, whereupon the reactants are thoroughly mixed with 6000 parts of ice-cold water. The resultant mixture is allowed to stand for 2 hours, at which point the bottom layer is drawn off and taken up in 500 parts of ether. The ether solution is consecutively washed with aqueous 5% sodium hydroxide and water, dried over anhydrous sodium sulfate, and stripped of solvent by vacuum distillation. The residue is ethyl 2-(2-acetoxyethyl)benzoylacetate.

(B) 2 - amino - 4 - hydroxy - 6 - phenyl-5-pyrimidineethanol.—A mixture of 153 parts of ethyl 2-(2-acetoxyethyl)benzoylacetate, approximately 108 parts of guanidine hydrochloride, and 60 parts of sodium methoxide in 1000 parts of tert-butyl alcohol is heated at the boiling point under reflux with agitation for 18 hours, then stripped of solvent by vacuum distillation. To the residue is added, with agitation, 6000 parts of water, followed by 70 parts of glacial acetic acid. Insoluble solids are filtered off, washed with water, dried in air, and taken up in 10 volumes of methanol containing just sufficient sodium hydroxide to render the solution alkaline. The alkaline solution is treated with decolorizing charcoal, filtered off, and precipitated by acidifying with acetic acid. The precipitate is filtered off, washed with water, and dried in air. The product thus isolated is 2-amino-4-hydroxy-6-phenyl-5-pyrimidineethanol.

(C) 2-amino-4-chloro-6-phenyl-5-pyrimidineethanol.— A solution of 83 parts of 2-amino-4-hydroxy-6-phenyl-5-pyrimidineethanol in 186 parts of phosphorus oxychloride is heated at the boiling point under reflux for 30 minutes, then poured onto a mixture of 2000 parts of crushed ice and 1000 parts of water. The resultant mixture is stirred for 30 minutes, whereupon 850 parts of concentrated ammonium hydroxide is introduced and stirring then resumed for a further 30 minutes. Aqueous supernatant is decanted from the gummy material which settles out, and the latter is taken up in 800 parts of a 1:1 mixture of ethyl acetate and dichloromethane. The resultant solution is washed with water, dried over anhydrous sodium sulfate, and stripped of solvent by vacuum distillation. The residue is 2-amino-4-chloro-6-phenyl-5-pyrimidineethanol.

(D.) 2-amino-4-azido-6-phenyl-5-pyrimidineethanol. — To a solution of 36 parts of 2-amino-4-chloro-6-phenyl-5-pyrimidineethanol in 270 parts of dimethyl sulfoxide is added 12 parts of sodium azide. The resultant mixture is stirred at 80° for 20 hours, then poured into 2000 parts of cold water. Insoluble solids are filtered off, washed with water, and dried in air. The product thus isolated is 2-amino-4-azido-6-phenyl-5-pyrimidineethanol, having the formula

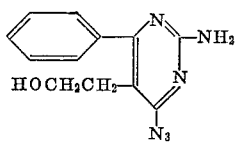

Example 22

2-amino-4-azido-6-phenyl-5-pyrimidineethyl acetate. — To a solution of 51 parts of 2-amino-4-azido-6-phenyl-5-pyrimidineethanol in 150 parts of pyridine is added 22 parts of acetic anhydride. The resultant mixture is stirred at room temperatures for 4 hours, then poured into 1500 parts of water. The mixture thus obtained is stirred for 1 hour, whereupon insoluble solids are filtered off, washed with water, and dried in air. The product thus isolated is 2 - amino - 4 - azido - 6 - phenyl - 5 - pyrimidineethyl acetate, having the formula

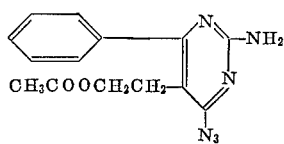

Example 23

(A.) 5 - acetonyl-2-amino-4-azido-6 - phenylpyrimidine. — To 54 parts of 2-amino-4-azido-6-phenyl-5-(2-propynyl)-pyrimidine dissolved in 500 parts of aqueous 65% acetic acid is added, with agitation, 22 parts of concentrated sulfuric acid, followed by a solution prepared by adding 8 parts of mercuric sulfate to 40 parts of water and then mixing in, consecutively, 25 parts of concentrated sulfuric acid and 100 parts of aqueous 65% acetic acid. The resultant solution is heated at 80° with continued agitation for 2 hours, then filtered. The filtrate is poured into 3000 parts of ice and water, whereupon sufficient ammonium hydroxide is added to induce basicity. The insoluble solids thrown down are filtered off, washed with water, dried in air, and recrystallized from methyl alcohol to give 5-acetonyl-2-amino-4-azido-6-phenylpyrimidine melting at approximately 188–189°.

(B.) 2 - amino - 4 - azido - α - methyl - 6 - phenyl - 5 - pyrimidineethanol. — To a solution of 32 parts of lithium tri-tert-butoxyaluminum hydride in 400 parts of tetrahydrofuran at room temperature under nitrogen is added, with agitation, a solution of 27 parts of 5-acetonyl-2-amino-4-azido-6-phenylpyrimidine in 800 parts of tetrahydrofuran. Agitation is continued for a further 3½ hours after the addition is complete, at which point 100 parts of an equi-volume mixture of acetic acid and water is slowly mixed in. Tetrahydrofuran is then removed by vacuum distillation, at which point 2500 parts of water is introduced. The crystalline precipitate thrown down is filtered off, washed with water, dried in air, and recrystallized from methyl alcohol to give 2-amino-4-azido-α-methyl-6-phenyl-5-pyrimidineethanol melting at approximately 171–172°. The product has the formula

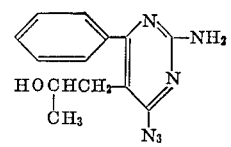

Example 24

2 - amino - 4 - azido - α - methyl - 6 - phenyl - 5 - pyrimidineethyl acetate. — Substitution of 54 parts of 2-amino-4-azido-α-methyl-6-phenyl-5-pyrimidineethanol for the 2-amino-4-azido-6-phenyl-5-pyrimidineethanol called for in Example 22 affords, by the procedure there detailed, 2-amino-4-azido-α-methyl-6-phenyl-5-pyrimidineethyl acetate which, recrystallized from methyl alcohol, melts at approximately 153–154°. The product has the formula

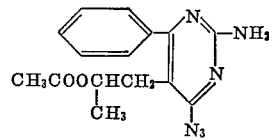

Example 25

2 - amino - 4 - azido - α - methyl - 6 - phenyl - 5 - pyrimidineethyl 2,2-dimethylpropionate. — To a solution of 54 parts of 2-amino-4-azido-α-methyl-6-phenyl-5-pyrimidineethanol in 250 parts of pyridine is slowly added, with stirring, 26 parts of trimethylacetyl chloride. The resultant solution is stirred at room temperatures for 2 hours, then poured into 250 parts of water. Precipitation occurs. The crystalline solids thrown down are filtered off, washed with water, dried in air, and recrystalized from methyl alcohol to give 2-amino-4-azido-α-methyl-6-phenyl-5-pyrimidineethyl 2,2-dimethylpropionate melting at approximately 140–140.5°. The product has the formula

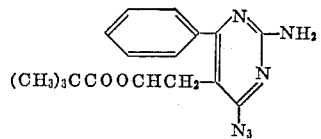

Example 26

2 - amino - 4 - azido - α - methyl - 6 - phenyl - 5 - pyrimidineethyl cyclopropanecarboxylate. — Substitution of 24 parts of cyclopropanecarbonyl chloride for the trimethylacetyl chloride called for in Example 25 affords, by the procedure there detailed, 2-amino-4-azido-α-methyl-6-phenyl-5-pyrimidineethyl cyclopropanecarboxylate melting at approximately 152–153°. The product has the formula

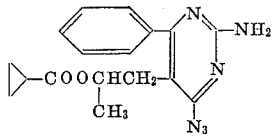

Example 27

2 - amino - 4 - azido-α-methyl-6-phenyl-5-pyrimidineethyl cyclohexanecarboxylate.—To a solution of 54 parts of 2-amino - 4 - azido - α - methyl-6-phenyl-5-pyridimdineethanol in 250 parts of pyridine is added 32 parts of cyclohexanecarbonyl chloride. The resultant solution is stirred for 2 hours at room temperatures, then poured into 3000 parts of water. A gummy solid settles out. Supernatant liquid is decanted and the residue dissolved in ether. The ether solution is consecutively washed with aqueous 10% acetic acid, aqueous 5% sodium bicarbonate, and water; then dried over anhydrous sodium sulfate; and finally stripped of solvent by distillation. The residue, recrystallized from a mixture of ether and hexane, affords 2-amino-4-azido - α - methyl - 6 - phenyl-5-pyrimidineethyl cyclohexanecarboxylate melting at approximately 108–109°. The product has the formula

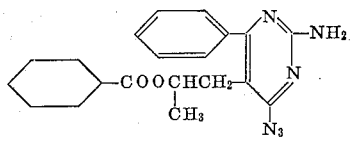

Example 28

2-amino - 4 - azido - α - methyl-6-phenyl-5-pyrimidineethyl benzoate.—Substitution of 31 parts of benzoyl chloride for the cyclohexanecarbonyl chloride called for in Example 27 affords, by the procedure there detailed, 2-amino - 4 - azido - α - methyl-6-phenyl-5-pyrimidineethyl benzoate having the formula

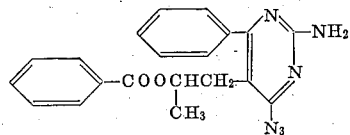

Example 29

2-amino - 4 - azido - α - methyl-6-phenyl-5-pyrimidineethyl p-chlorobenzoate.—To a solution of 54 parts of 2-amino - 4 - azido-α-methyl - 6 - phenyl-5-pyrimidineethanol in 250 parts of pyridine is added 42 parts of p-chlorobenzoyl chloride. The resultant solution is stirred at room temperatures for 2 hours, then poured into 4000 parts of water. Supernatant liquid is decanted from the gummy material thrown down, whereupon the solid material is taken up in 250 parts of acetone. The acetone solution is diluted with 3000 parts of water. Precipitation occurs. The precipitate is filtered off, washed with aqueous 1½ percent sodium carbonate, and then with water. Crystallization from a mixture of ether and pentane affords 2-amino - 4 - azido-α-methyl - 6 - phenyl-5-pyrimidineethyl p-chlorobenzoate melting at approximately 160–161°. The product has the formula

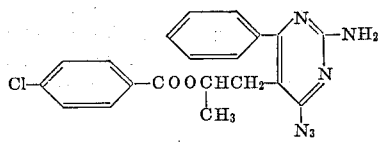

Example 30

2-amino - 4 - azido-α-methyl - 6 - phenyl-5-pyrimidineethyl diphenylacetate.—To a solution of 54 parts of 2-amino - 4 - azido-α-methyl - 6 - phenyl-5-pyrimidineethanol in 400 parts of pyridine is added 60 parts of diphenylacetyl chloride. The resultant solution is maintained with agitation at room temperatures for 2 hours, then poured into 4000 parts of water. A sticky mass settles out. Supernatant liquid is decanted, and the residue is taken up in 500 parts of dichloromethane. The dichloromethane solution is consecutively washed with aqueous 10% acetic acid, aqueous 5% sodium bicarbonate, and water, then dried over anhydrous sodium sulfate, and stripped of solvent by vacuum distillation. Recrystallization of the residue from a mixture of ether and hexane affords 2-amino - 4 - azido-α-methyl - 6 - phenyl-5-pyrimidineethyl diphenylacetate melting at approximately 177–178°. The product has the formula

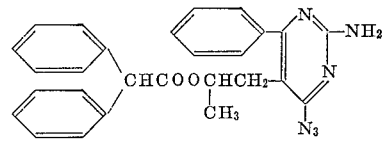

Example 31

(A) Ethyl 2-benzoyl-3-methoxypropionate.—To a solution of 192 parts of ethyl benzoylacetate and 24 parts of sodium hydride in 1000 parts of dimethyl sulfoxide at 60° under nitrogen is added, with constant stirring during 2 hours, 81 parts of chloromethyl methyl ether. Temperature is then increased to 75° and stirring continued thereat for a further 16 hours, whereupon the reactants are thoroughly mixed with 6000 parts of ice-cold water. The resultant mixture is allowed to stand for 2 hours, at which point the bottom layer is drawn off and taken up in 500 parts of ether. The ether solution is consecutively washed with aqueous 5% sodium hydroxide and water, dried over anhydrous sodium sulfate, and stripped of solvent by vacuum distillation. The residue is ethyl 2-benzoyl-3-methoxypropionate.

(B) 2-amino-5-methoxymethyl - 6 - phenyl - 4 - pyrimidinol.—A mixture of 132 parts of ethyl 2-benzoyl-3-methoxypropionate, approximately 108 parts of guanidine hydrochloride, and 60 parts of sodium methoxide in 1000 parts of tert-butyl alcohol is heated at the boiling point under reflux with agitation for 18 hours, then stripped of solvent by vacuum distillation. To the residue is added, with agitation, 6000 parts of water, followed by 70 parts of glacial acetic acid. Insoluble solids are filtered off, washed with water, dried in air, and taken up in 10 volumes of methanol containing just sufficient sodium hydroxide to render the solution alkaline. The alkaline solution is treated with decolorizing charcoal, filtered off, and precipitated by acidifying with acetic acid. The precipitate is filtered off, washed with water, and dried in air. The product thus isolated is 2-amino-5-methoxymethyl-6-phenyl-4-pyrimidinol.

(C) 2-amino-4-chloro-5-methoxymethyl - 6 - phenylpyrimidine.—A solution of 83 parts of 2-amino-5-methoxymethyl-6-phenyl-4-pyrimidinol in 186 parts of phosphorus oxychloride is heated at the boiling point under reflux for 30 minutes, then poured onto a mixture of 2000 parts of crushed ice and 1000 parts of water. The resultant mixture is stirred for 30 minutes, whereupon 850 parts of concentrated ammonium hydroxide is introduced and stirring then resumed for a further 30 minutes. Aqueous supernatant is decanted from the gummy material which settles out, and the latter is taken up in 800 parts of a 1:1 mixture of ethyl acetate and dichloromethane. The resultant solution is washed with water, dried over anhydrous sodium sulfate, and stripped of solvent by vacuum distillation. The residue is 2-amino-4-chloro-5-methoxymethyl-6-phenylpyrimidine.

(D) 2-amino-4-azido-5-methoxymethyl-6-phenylpyrimidine.—To a solution of 36 parts of 2-amino-4-chloro-5-methoxymethyl-6-phenylpyrimidine in 270 parts of dimethyl sulfoxide is added 12 parts of sodium azide. The resultant mixture is stirred at 80° for 20 hours, then poured into 2000 parts of cold water. Insoluble solids are filtered off, washed with water, and air dried. The product thus isolated is 2-amino-4-azido-5-methoxymethyl-6-phenylpyrimidine, having the formula

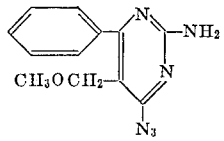

Example 32

(A) Ethyl 2-benzoyl-4-methoxybutyrate.—Substitution of 54 parts of sodium methoxide and 139 parts of 2-bromoethyl methyl ether for the sodium hydride and chloromethyl methyl ether, respectively, called for in Example 31A affords, by the procedure there detailed, ethyl 2-benzoyl-4-methoxybutyrate.

(B) 2-amino-5-methoxyethyl-6-phenyl-4-pyrimidinol.— Substitution of 140 parts of ethyl 2-benzoyl-4-methoxybutyrate for the ethyl 2-benzoyl-3-methoxypropionate called for in Example 31B affords, by the procedure there detailed, 2-amino-5-methoxyethyl-6-phenyl-4-pyrimidinol melting at 292–293°.

(C) 2-amino-4-chloro-5-methoxyethyl-6-phenylpyrimidine.—Substitution of 88 parts of 2-amino-5-methoxyethyl-6-phenyl-4-pyrimidinol for the 2-amino-5-methoxymethyl-6-phenyl-4-pyrimidinol called for in Example 31C affords, by the procedure there detailed, 2-amino-4-chloro-5-methoxyethyl-6-phenylpyrimidine.

(D) 2 - amino-4-azido-5-methoxyethyl-6-phenylpyrimidine.—Substitution of 38 parts of 2-amino-4-chloro-5-methoxyethyl-6-phenylpyrimidine for the 2-amino-4-chloro-5-methoxymethyl-6-phenylpyrimidine called for in Example 31D affords, by the procedure there detailed, 2-amino-4-azido-5 - methoxyethyl - 6 - phenylpyrimidine which, recrystallized from methanol, melts at approximately 197–198°. The product has the formula

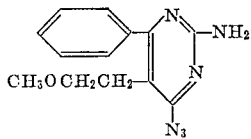

Example 33

(A) Ethyl 2-benzoyl - 4 - ethoxybutyrate.—Substitution of 54 parts of sodium methoxide and 153 parts of 2-bromoethyl ethyl ether for the sodium hydride and chloromethyl methyl ether, respectively, called for in Example 31A affords, by the procedure there detailed, ethyl 2-benzoyl-4-ethoxybutyrate, which is further purified by vacuum distillation. It boils at 133–139° under 0.2 mm. pressure.

(B) 2 - amino - 5-ethoxyethyl-6-phenyl-4-pyrimidinol.— Substitution of 148 parts of ethyl 2-benzoyl-4-ethoxybutyrate for the ethyl 2 - benzoyl - 3 - methoxypropionate called for in Example 31B affords, by the procedure there detailed, 2-amino-5-ethoxyethyl-6-phenyl - 4 - pyrimidinol melting at 278–280°.

(C) 2-amino-4-chloro-5-ethoxyethyl - 6 - phenylpyrimidine.—Substitution of 93 parts of 2-amino-5-ethoxyethyl-6-phenyl-4-pyrimidinol for the 2-amino-5-methoxymethyl-6-phenyl-4-pyrimidinol called for in Example 31C affords, by the procedure there detailed, 2-amino-4-chloro-5-ethoxyethyl-6-phenylpyrimidine which crystallizes on standing and melts at 102–105°.

(D) 2 - amino - 4 - azido-5-ethoxyethyl-6-phenylpyrimidine.—Substitution of 40 parts of 2-amino-4-chloro-5-ethoxyethyl-6-phenylpyrimidine for the 2-amino-4-chloro-5-methoxymethyl-6-phenylpyrimidine called for in Example 31D affords, by the procedure there detailed, 2-amino-4-azido-5-ethoxyethyl-6-phenylpyrimidine which, recrystallized from methanol, melts at 162–164°. The product has the formula

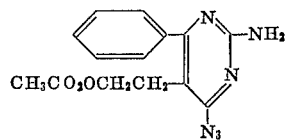

Example 34

(A) Ethyl 2-benzoyl-5-ethoxyvalerate.—Substitution of 54 parts of sodium methoxide and 167 parts of ethyl 3-bromopropyl ether for the sodium hydride and chloromethyl methyl ether, respectively, called for in Example 31A affords, by the procedure there detailed, ethyl 2-benzoyl-5-ethoxyvalerate.

(B) 2-amino-5-ethoxypropyl-6-phenyl-4-pyrimidinol.— Substitution of 156 parts of ethyl 2-benzoyl-5-ethoxyvalerate for the ethyl 2-benzoyl-3-methoxypropionate called for in Example 31B affords, by the procedure there detailed, 2-amino-5-ethoxypropyl-6-phenyl-4-pyrimidinol.

(C) 2 - amino-4-chloro-5-ethoxypropyl-6-phenyl-pyrimidine.—Substitution of 98 parts of 2-amino-5-ethoxypropyl-6-phenyl-4-pyrimidinol for the 2-amino-5-methoxymethyl-6-phenyl-4-pyrimidinol called for in Example 31C affords, by the procedure there detailed, 2-amino-4-chloro-5-ethoxypropyl-6-phenylpyrimidine.

(D) 2 - amino - 4-azido-5-ethoxypropyl-6-phenylpyrimidine monohydrate.—Substitution of 42 parts of 2-amino-4-chloro-5-methoxypropyl-6-phenylpyrimidine for the 2 - amino - 4-chloro-5-methoxymethyl-6-phenylpyrimidine called for in Example 31D affords, by the procedure there detailed, 2-amino-4-azido-5-ethoxypropyl-6-phenylpyrimidine monohydrate melting at approximately 179–180°. The product has the formula

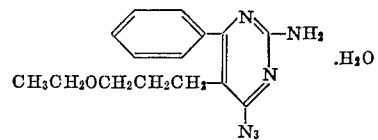

Water of crystallization is azeotropically removed by boiling toluene.

Example 35

(A) Ethyl 2-benzoyl-4-phenoxybutyrate.—Substitution of 54 parts of sodium methoxide and 201 parts of 2-bromoethyl phenyl ether for the sodium hydride and chloromethyl methyl ether, respectively, called for in Example 31A affords, by the procedure there detailed, ethyl 2-benzoyl-4-phenoxybutyrate.

(B) 2 - amino - 5 - phenoxyethyl-6-phenyl-4-pyrimidinol.—Substitution of 175 parts of ethyl 2-benzoyl-4-phenoxybutyrate for the ethyl 2-benzoyl-3-methoxypropionate called for in Example 31B affords, by the procedure there detailed, 2-amino-5-phenoxyethyl-6-phenyl-4-pyrimidinol.

(C) 2 - amino - 4 - chloro - 5 - phenoxyethyl-6-phenyl-pyrimidine.—Substitution of 110 parts of 2-amino-5-phenoxyethyl-6-phenyl-4-pyrimidinol for the 2-amino-5-methoxymethyl-6-phenyl-4-pyrimidinol called for in Example 31C affords, by the procedure there detailed, 2-amino-4-chloro-5-phenoxyethyl-6-phenylpyrimidine.

(D) 2 - amino - 4 - azido-5-phenoxyethyl-6-phenyl-pyrimidine.—Substitution of 47 parts of 2-amino-4-chloro-5-phenoxyethyl-6-phenylpyrimidine for the 2-amino-4-chloro-5-methoxymethyl-6-phenylpyrimidine called for in Example 31D affords, by the procedure there detailed, 2-amino-4-azido-5-phenoxyethyl-6-phenylpyrimidine, having the formula

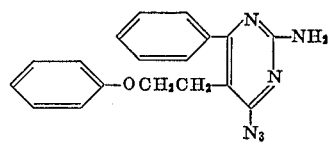

Example 36

(A) 5 - ethoxyethyl - 2-methylamino-6-phenyl-4-pyrimidinol.—Substitution of 148 parts of ethyl 2-benzoyl-4-ethoxybutyrate and 124 parts of methylguanidine hydrochloride for the ethyl 2-benzoyl-3-methoxypropionate and guanidine hydrochloride, respectively, called for in Example 31B affords, by the procedure there detailed, 5-ethoxyethyl-2-methylamino-6-phenyl-4-pyrimidinol.

(B) 4 - chloro - 5 - ethoxyethyl-2-methylamino-6-phenylpyrimidine.—Substitution of 98 parts of 5-ethoxyethyl-2-methylamino-6-phenyl-4-pyrimidinol for the 2-amino-5-methoxymethyl-6-phenyl-4-pyrimidinol called for in Example 31C affords, by the procedure there detailed, 4-chloro-5-ethoxyethyl-2-methylamino-6-phenylpyrimidine.

(C) 4 - azido - 5 - ethoxyethyl-2-methylamino-6-phenylpyrimidine.—Substitution of 42 parts of 4-chloro-5-ethoxyethyl-2-methylamino-6-phenylpyrimidine for the 2-amino - 4-chloro-5-methoxymethyl-6-phenylpyrimidine called for in Example 31D affords, by the procedure there detailed, 4 - azido-5-ethoxyethyl-2-methylamino-6-phenylpyrimidine, having the formula

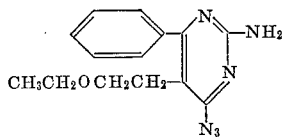

Example 37

2 - amino - 4 - azido - 5-methyl-6-phenylpyrimidine hydrochloride.—Approximately 5 parts of 2-amino-4-azido-5-methyl-6-phenylpyrimidine is dissolved in approximately 400 parts of warm concentrated hydrochloric acid. The solution is stripped of solvent by vacuum distillation, whereupon the residue is recrystallized from methanol. The product thus isolated is 2-amino-4-azido-5-methyl-6-phenylpyrimidine hydrochloride melting at 187–190° with decomposition.

Example 38

2 - amino - 4 - azido - 5-ethoxyethyl-6-phenylpyrimidine hydrochloride.—Substitution of 5 parts of 2-amino-4-azido-5-ethoxyethyl-6-phenylpyrimidine and acetone for the 2 - amino - 4-azido-5-methyl-6-phenylpyrimidine and methanol, respectively, called for in Example 37 affords, by the procedure there disclosed, 2-amino-4-azido-5-ethoxyethyl-6-phenylpyrimidine hydrochloride melting at approximately 140°.

What is claimed is:
1. A compound of the formula

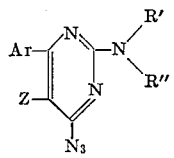

wherein Ar is thienyl or a radical of the formula

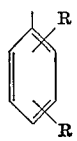

in which R is hydrogen, lower alkyl, lower alkoxy, halogen of atomic number greater than 9 and less than 53, or nitro; R' and R" are each hydrogen or lower alkyl; and Z is hydrogen, lower alkyl, lower alkenyl, lower alkynyl, or lower alkyl substituted solely by hydroxy, lower alkanoyloxy, cycloalkanoyloxy containing more than 3 and fewer than 8 carbon atoms, benzoyloxy, chlorobenzoyloxy, diphenylacetoxy, lower alkoxy, or phenoxy.

2. A compound according to claim 1 in which Z is hydrogen, lower alkyl, lower alkenyl, or lower alkynyl.

3. A compound according to claim 1 which is 2-amino-4-azido-6-phenylpyrimidine.

4. A compound according to claim 1 having the formula

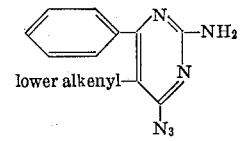

5. A compound according to claim 1 which is 2-amino-4-azido-5-methyl-6-phenylpyrimidine.

6. A compound according to claim 1 having the formula

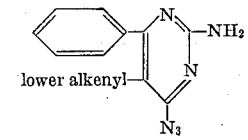

7. A compound according to claim 1 which is 2-allyl-2-amino-4-azido-6-phenylpyrimidine.

8. A compound according to claim 1 having the formula

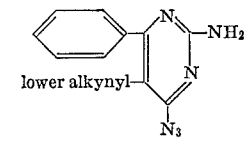

9. A compound according to claim 1 which is 2-amino-4-azido-6-phenyl-5-(2-propynyl)pyrimidine.

10. A compound according to claim 1 having the formula

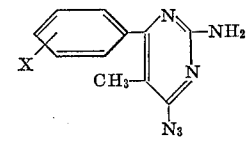

in which X is halogen of atomic number greater than 9 and less than 53.

11. A compound according to claim 1 which is 2-amino-4-azido-6-(p-chlorophenyl)-5-methylpyrimidine.

12. A compound according to claim 1 in which Ar is phenyl, R' is hydrogen, R" is lower alkyl, and Z is lower alkyl substituted solely by lower alkoxy or phenoxy.

13. A compound according to claim 1 which is 2-amino-4-azido-5-methoxymethyl-6-phenylpyrimidine.

14. A compound according to claim 1 which is 2-amino-4-azido-5-methoxyethyl-6-phenylpyrimidine.

15. A compound according to claim 1 which is 2-amino-4-azido-5-ethoxyethyl-6-phenylpyrimidine.

16. A compound according to claim 1 which is 2-amino-4-azido-5-ethoxypropyl-6-phenylpyrimidine.

17. A compound according to claim 1 which is 2-amino-4-azido-5-phenoxyethyl-6-phenylpyrimidine.

18. A compound according to claim 1 which is 4-azido-5-ethoxyethyl-2-methylamino-6-phenylpyrimidine.

19. A compound according to claim 1 in which Ar is phenyl; R' and R" are each hydrogen; and Z is lower alkyl substituted solely by hydroxy, lower alkanoyloxy, cycloalkanoyloxy containing more than 3 and fewer than 8 carbon atoms, benzoyloxy, chlorobenzoyloxy, or diphenylacetoxy.

20. A compound according to claim 1 in which Ar is phenyl, R' and R" are each hydrogen, and Z is lower alkyl substituted solely by hydroxy.

21. A compound according to claim 1 which is 2- amino-4-azido-α-methyl-6-phenyl-5-pyrimidineethanol.

22. A compound according to claim 1 in which Ar is phenyl, R' and R'' are each hydrogen, and Z is lower alkyl substituted solely by lower alkanoyloxy.

23. A compound according to claim 1 which is 2-amino-4-azido-α-methyl-6-phenyl-5-pyrimidineethyl acetate.

24. A compound according to claim 1 having the formula

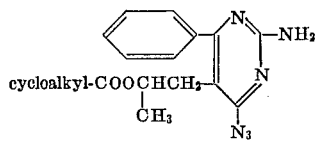

wherein the cycloalkyl radical called for contains more than 3 and fewer than 8 carbon atoms.

25. A compound according to claim 1 which is 2-amino-4-azido-α-methyl-6-phenyl-5-pyrimidineethyl cyclopropanecarboxylate.

26. A compound according to claim 1 which is 2-amino - 4 - azido-α-methyl-6-phenyl-5-pyrimidineethyl diphenylacetate.

27. A compound of the formula

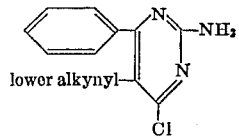

References Cited
UNITED STATES PATENTS

| | | | |
|---|---|---|---|
| 2,688,019 | 8/1954 | Hitchings et al. | 260—256.4 |
| 2,698,326 | 12/1954 | Suter et al. | 260—256.4 |
| 2,710,867 | 6/1955 | Rorig et al. | 260—256.4 |
| 2,731,465 | 1/1956 | Schroeder | 260—256.4 |

NICHOLAS S. RIZZO, *Primary Examiner.*

R. J. GALLAGHER, *Assistant Examiner.*

UNITED STATES PATENT OFFICE
CERTIFICATE OF CORRECTION

Patent No. 3,412,094                                      November 19, 196

Kurt J. Rorig et al

It is certified that error appears in the above identified patent and that said Letters Patent are hereby corrected as shown below:

Column 10, line 24, "dimethyl-amino" should read -- dimethylamino --.
Column 14, lines 55 to 60, the right-hand portion of the formula should appear as shown below:

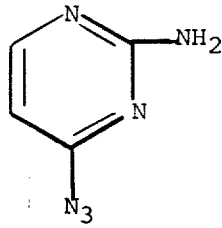

Column 22, lines 6 to 10, in the formula "lower alkenyl" should read -- lower alkyl --.

Signed and sealed this 17th day of March 1970.

(SEAL)
Attest:

EDWARD M.FLETCHER,JR.                         WILLIAM E. SCHUYLER, JR.
Attesting Officer                             Commissioner of Patents